(12) United States Patent
English et al.

(10) Patent No.: US 8,321,910 B1
(45) Date of Patent: Nov. 27, 2012

(54) DETERMINING THE SOURCE OF MALWARE

(75) Inventors: Edward D. English, Scituate, MA (US); Geoffrey B. Grindrod, Santa Clara, CA (US)

(73) Assignee: Trend Micro, Inc., Tokyo (JP)

( * ) Notice: Subject to any disclaimer, the term of this patent is extended or adjusted under 35 U.S.C. 154(b) by 922 days.

(21) Appl. No.: 11/337,054

(22) Filed: Jan. 20, 2006

Related U.S. Application Data

(60) Provisional application No. 60/645,798, filed on Jan. 21, 2005.

(51) Int. Cl.
*G06F 12/14* (2006.01)

(52) U.S. Cl. ............................................. 726/2; 726/24

(58) Field of Classification Search .................. 713/153, 713/163, 183, 193, 340, 164, 150; 714/38, 714/49, 48, 35, 37; 709/203, 217, 223, 237, 709/225, 229, 227; 726/22, 14, 13, 11, 34, 726/25, 26, 27; 380/42, 55, 58, 46; 382/225, 382/581; 375/340; 345/581, 55; 707/E17.128, 707/E17.129, E17.118

See application file for complete search history.

(56) References Cited

U.S. PATENT DOCUMENTS

| | | | | |
|---|---|---|---|---|
| 5,886,699 | A * | 3/1999 | Belfiore et al. | 715/843 |
| 7,096,500 | B2 * | 8/2006 | Roberts et al. | 726/24 |
| 2005/0005160 | A1 * | 1/2005 | Bates et al. | 713/200 |
| 2006/0031673 | A1 * | 2/2006 | Beck et al. | 713/164 |
| 2006/0070130 | A1 * | 3/2006 | Costea et al. | 726/24 |
| 2006/0075500 | A1 * | 4/2006 | Bertman et al. | 726/24 |
| 2006/0075502 | A1 * | 4/2006 | Edwards | 726/24 |
| 2006/0095964 | A1 * | 5/2006 | Costea | 726/22 |
| 2006/0095970 | A1 * | 5/2006 | Rajagopal et al. | 726/25 |
| 2006/0101282 | A1 * | 5/2006 | Costea et al. | 713/188 |
| 2006/0130141 | A1 * | 6/2006 | Kramer et al. | 726/23 |

* cited by examiner

*Primary Examiner* — Brandon Hoffman
*Assistant Examiner* — Nega Woldemariam
(74) *Attorney, Agent, or Firm* — Beyer Law Group LLP

(57) ABSTRACT

A malware detection system capable of detecting and removing malware from a computer system. The malware detection system determines whether there are files potentially related to a selected malware file using a time-based embodiment based on whether files were installed around the time of the malware. A cache-based embodiment searches an Internet cache to determine the URLs that might be the source of the malware. A location-based embodiment dissects the file system path to determine an application related to the malware. Results are displayed to the user for action.

15 Claims, 5 Drawing Sheets

DETERMINING THE SOURCE OF MALWARE

CROSS REFERENCE TO RELATED APPLICATIONS

This application claims priority under 35 U.S.C. §119(e) of U.S. patent application No. 60/645,798 filed Jan. 21, 2005 which is incorporated herein by reference for all purposes.

FIELD OF THE INVENTION

The present invention relates generally to methods, systems and software for searching for, detecting, removing and preventing the installation of spyware, viruses, worms and other "malware" that may infiltrate a computer or other digital processor, and in particular, relates to methods, systems and software utilizing file system properties and Internet cache to determine the source of malware.

BACKGROUND OF THE INVENTION

As use of the Internet and other network architectures increases, the problems and harmful effects of spyware and other "malware" increases exponentially. The term "malware" is used herein to connote any software that may be installed onto a computer without the user's full consent or awareness, including software that may gather information from the computer, sometimes without the user's knowledge. Malware may present a privacy, security or productivity risk to the user's computer system. It would be desirable to provide methods, systems and software products that could enable the user to understand how and where their system obtained such malware, since this would also enable the user to prevent re-installation of the malware, which might otherwise compromise their privacy and their productive use of their computer system.

Malware can be installed onto a computer in various ways, sometimes with the unwitting assistance of an unsuspecting computer user. Described below are some of the methods by which malware can be installed on a given system:

Peer-to-Peer file sharing software: Such software (an example of which is Kazaa) enables a user to share files with many other users on the Internet. This type of software typically includes ad-supported versions that may themselves be, or include, malware, and may install other third-party malware applications. In many instances, since the End-User License Agreement (EULA) associated with such file sharing software is verbose and cryptic, the user is likely to simply ignore the agreement and simply click "I Accept", even though the EULA may explicitly indicate that spyware or other malware applications are about to be or may later be installed. Thus, the user may not be fully aware of the nature or extent of the software to be installed, the malware that may be included therein, and the scope of what such software can do.

Pop-Up Downloads: This category includes software that is installed by prompting the user via a pop-up or other prompting device while the user browses the Internet. Typically, such installations can be accomplished using methods such as ActiveX or the like. For example, the user may accept the installation of a pop-up download prompt in order to proceed to another Web page, or if they are given the impression that the software may serve a valid and necessary purpose. In addition, if the user chooses to "Always Accept" pop-up downloads from a particular company or other source, that source can then execute a "Drive-By Download" (next described) of additional software without requiring the users permission, whenever the user visits a company-related site.

Drive-By-Downloads: This category includes software that is installed without prompting the user for permission, while they are browsing the Internet. Typically this also can be accomplished using ActiveX or the like, or via a security hole in the browser or operating system (OS). In the case of ActiveX, the user typically browses to a Web page that contains code that uses an existing component on their system to deliver the malware payload. Other types of browser or OS security holes could allow code fragments from a Web page to arbitrarily execute commands on the user's system.

Other Ad-Supported Applications: These may include ad-supported applications include music players, audio/video coder-decoders, weather or stock monitoring software and browser add-on software. These applications may be or include malware, and potentially may install other third-party malware that poses a privacy, security or productivity threat to a user's system.

Operating System Security Holes: As alluded to above, operating systems frequently have many security holes that can be exploited by such malware as viruses, trojans, downloaders and worms. These security "back doors" allow Malware to spread from system to system. The existence of certain malware on a given system may aid in the delivery of other, different malware payloads.

E-mail/Newsgroup Attachments: Malicious emails that contain content designed to install malware represent a serious and growing threat. Malware delivered and executed via email can be installed either with the user's intervention, such as when the user opens an attachment, or with no user intervention at all, by exploiting an application event security hole like the automatic HTML preview feature in an email application.

Instant Messenger Application Exploits: Another recent problem is the use of Instant Messenger products to deliver malware to many different users. Typically, an IM user may receive a message notification through their IM application that entices them to install a malware application that claims to perform a specific task. Once installed, the application integrates with their IM application, using it as a base for broadcasting further messages, without the user's knowledge or consent, to other users in their "Buddy List", in order to promote further downloads of the malware or other application, to display Web pages, ads or other content of which the user may be unaware.

SUMMARY OF THE INVENTION

In one aspect, the invention provides a method for determining the source of a malware file. A file system associated with the malware file is searched utilizing a temporal property of the malware file. Source information identifying a potential source of the malware file is then generated based on the results of the file system search. The temporal property can include the time the file was created.

In another aspect of the invention, an Internet URL cache is searched utilizing the existence of the malware file's URL entry therein, and source information identifying a potential source of the malware is generated based on the results of the Internet URL cache search. Source information identifying a potential source of the malware also can, be generated utilizing a location property of the malware file. Searching the file system can include recursively searching the file system, and the location property can include a portion of the file path of the malware file or the full file path of the malware file.

These and other aspects are described in greater detail below in the Detailed Description of the Invention, together with the attached drawing figures, which will next be briefly described.

BRIEF DESCRIPTION OF THE DRAWINGS

Features and advantages of the present invention will become apparent to those skilled in the art from the detailed description below, in conjunction with the following drawing figures, in which.

GLOSSARY

Figure 1:
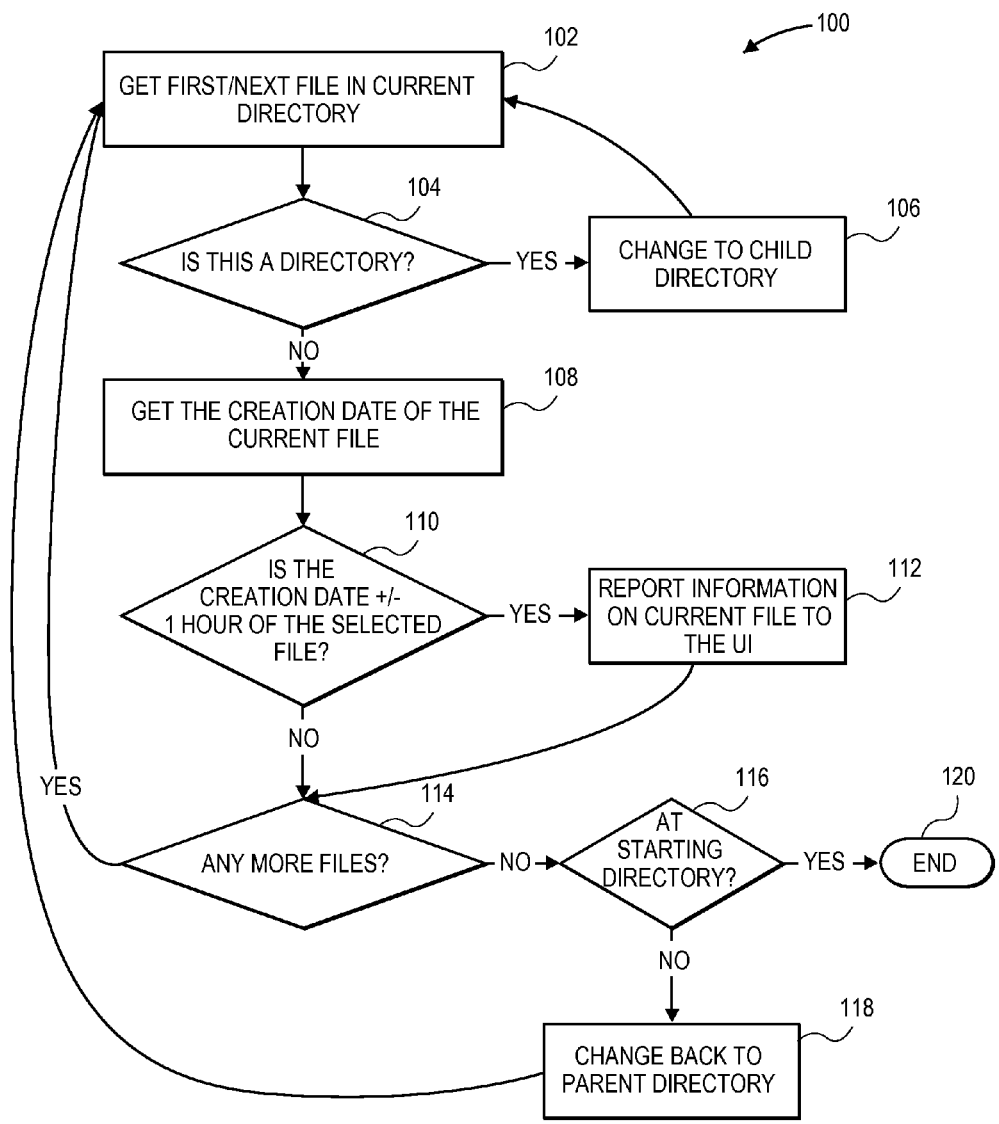
FIG. 1 is a flowchart describing a Time Based Source Component Detection method in accordance with one aspect of the present invention.

The following are terms utilized herein:

Malware: Any software that may be installed onto a computer without the user's full consent or awareness, and software which may gather information from the computer, sometimes without the user's knowledge. Malware may present a privacy, security or productivity risk to your computer system.

Application: A software program or group of software components intended to perform a specific general task (e.g. Peer-to-Peer File Sharing). In the context of this document, an application may or may not be considered Malware, and an Application may contain one or more components that are considered Malware.

Browser: Software tool used to request and view HTML pages from the web.

Web: The collection of Internet computers that provide HTML content in response to requests.

Internet Cache: A repository of recently accessed Internet URL's and web resources held and managed by the Web browser to reduce the amount of data that needs to be transferred for repeated access to Web sites.

Anti-Malware Engine: In the context of this document, components of software that are specifically designed to scan for and remove Malware from a given computer system.

EULA: End User License Agreement, the legal agreement a user may be required to accept before installing a software product.

ActiveX: A Microsoft™ technology that allows installation of software components via the Web.

Ad-supported Applications: Applications that are usually distributed free of charge, but often perform other non-application related activities on their system, such as displaying advertisements, and collecting profiling information.

DETAILED DESCRIPTION OF THE INVENTION

Overview

The present invention provides methods, systems and software products that may in turn be part of a larger software system or product for detecting and removing malware components from a user's computer system. In various embodiments of the invention described in detail below and illustrated in the attached drawings, the detected malware is listed in a user interface (UI); and from this UI, the user can perform various operations on the detected malware components, such as determining the source of a selected malware file component (referred to herein as the selected file). These functions can be supported and implemented by one or more of the methods of component source detection described below.

For example, in a time-based embodiment of the invention (illustrated in FIG. 1 and described in detail below), a user selects a file for analysis, and a "related file" detection method is employed that searches the user's entire hard disk or disks, for other files that were installed at or around the time at which the file in question was created. The files that have similar time properties are then listed for the user, which helps determine other applications that may have installed the selected file.

Other aspects and practices of the invention, which will also be described below, include using URL History from the system's Internet cache to determine the source URL of a file, and using the file's associated directory information to indicate which application may have installed the malware.

Those skilled in the art will understand that the methods, data structures and software techniques that will next be described can be implemented, using known computer software and hardware principles, on a conventional personal computer (PC) or other computing device or system, whether networked or standalone, desktop, handheld, wireless, or other digital processing platform.

Method 1: Time-Based Component Source Detection

In accordance with an embodiment of the invention, and referring now to FIG. 1, a malware source detection method 100 employs a recursive directory-searching algorithm to iterate through all files under a defined root directory. The root directory is the starting point for a recursive iteration of all files and directories thereunder. The first file (the current file) in the current directory (e.g., the root directory) is retrieved at 102 and checked for being a directory itself at 104. If the current file is a child directory, the current directory is changed to it at 106 and method 100 is restarted at 102. If the current file is not a directory, the time properties for the file are read at 108 and the creation date file system property of the file is checked at 110. If this creation date is found to be a specified time period (for example, one hour) plus or minus the selected file's creation date, then this file will be reported in the User Interface (UI) at 112 as being potentially related to the selected file and the process continues at 114, described below. If the creation date does not meet the comparison criteria, the method proceeds to 114. The underlying premise of this operation is that software that is installed on a user's fully configured system within a certain time threshold is most likely related to the selected file.

If there are more files to check in the current directory, the method is repeated starting with 102. If there are not, and the current directory is not the starting directory (116), then the current directory is changed to the parent directory at 118 and the method is repeated starting with 102. If the current directory is the starting directory, then all files have been checked and the method ends at 120.

This method is effective for determining files that are related to each other, regardless of where they may be in the file system, as files that were all installed at a particular time are likely to have been installed by the same application.

Method 2: Cache Based Component Source Detection

Figure 2:
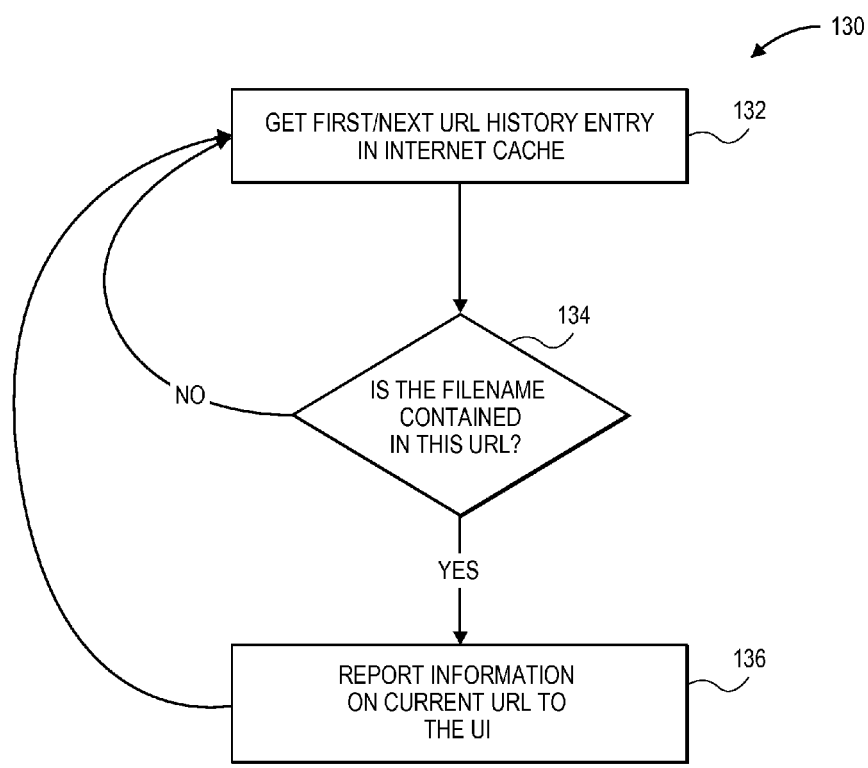
FIG. 2 is a flowchart describing a Cache Based Component Source Detection method in accordance with a further aspect of the present invention.

In accordance with another embodiment of the invention, and referring now to FIG. 2, method 130 employs the Internet cache maintained by the computer system's Web browser to determine the source URL of the selected file. Typically, the Internet cache, while caching copies of files and other resources from Web sites visited, also stores the URLs that have been accessed by the browser. If a user downloads a file from the Internet, this cache area will effectively "log" the URL of the download. The present invention exploits this native browser functionality by using the Internet cache as a "URL access log". This aspect of the invention operates by searching the list of URLs that are stored in the Internet cache area as they are accessed by the Web browser. The first URL is read at 132 and parsed. If any URL is seen to contain the filename of the selected file at 134, this URL will be reported in the UI at 136 as being potentially related to the selected file. Method 130 then repeats by getting the next URL history entry in the cache at 132.

This method is effective for determining the exact source URL of a spyware payload, particularly installers and directly installed components that may be available from multiple URL locations on the Internet.

Method 3: Location Based Component Source Detection

Figure 3:
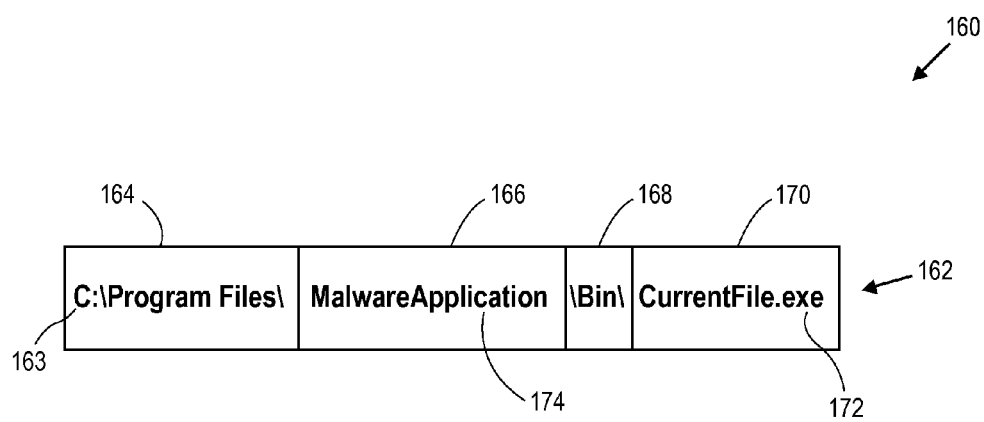
FIG. 3 is a diagram illustrating the method by which a Location Based Source Detection method in accordance with a further aspect of the present invention may be employed.

In accordance with another embodiment of the invention referring to FIG. 3, method 160 depicted therein operates by dissecting the full file system path 162 of the file into its drive 163, directories 164, 166, and 168, file name 170 extension 172 components. Then, by further parsing, the application's root directory name 174 is determined. Since this directory is likely to contain the name of the application, this is reported in the UI as being potentially related to the selected file. In other words, this segment of the path, 174, is extracted and reported to the UI as the Application Name. Thus, FIG. 3 is an example of the user selecting to determine the source of "CurrentFile.exe."

This method is effective for determining the name of an application, as some applications install themselves into a separate folder with a distinct name. This name may or may not be descriptive, but nonetheless provides the user with further clues as to what the malware application is.

Display of Results:

The results of using the three methods are delivered to the user in the User Interface, as will next be described in connection with FIGS. 4 and 5. Using this information, the user can deduce which applications may have installed the selected file.

Figure 4:
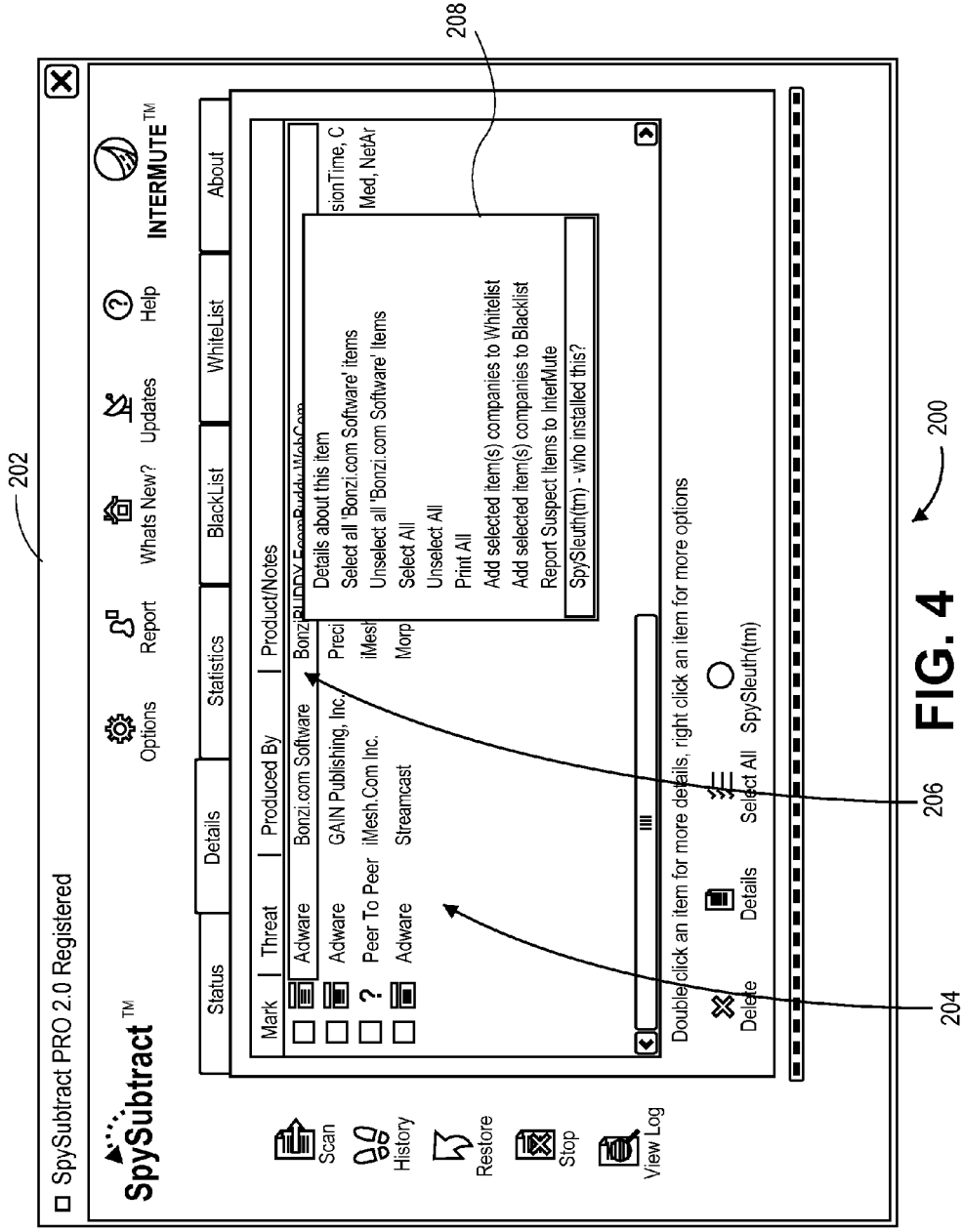
FIG. 4 is a screenshot depicting a malware detection and removal application displaying results of malware discovered on a user's computer system in accordance with the present invention.

Examples of Operation/Screenshots:

In accordance with a further practice and embodiment of the invention, FIG. 4 is a screenshot 200 depicting the malware detection and removal application 202 displaying results of components discovered on a user's system. The user can (1) browse information 204 on the component found, (2) select a particular component 206 for analysis and or removal, and (3) select from a list of functions 208 to determine the source of a selected malware component and remove the component using the methods of the invention described herein. Thus, FIG. 4 is an example of a screenshot of the anti-malware application. The application has detected an item and the user selects the function to determine the component's source.

Figure 5:
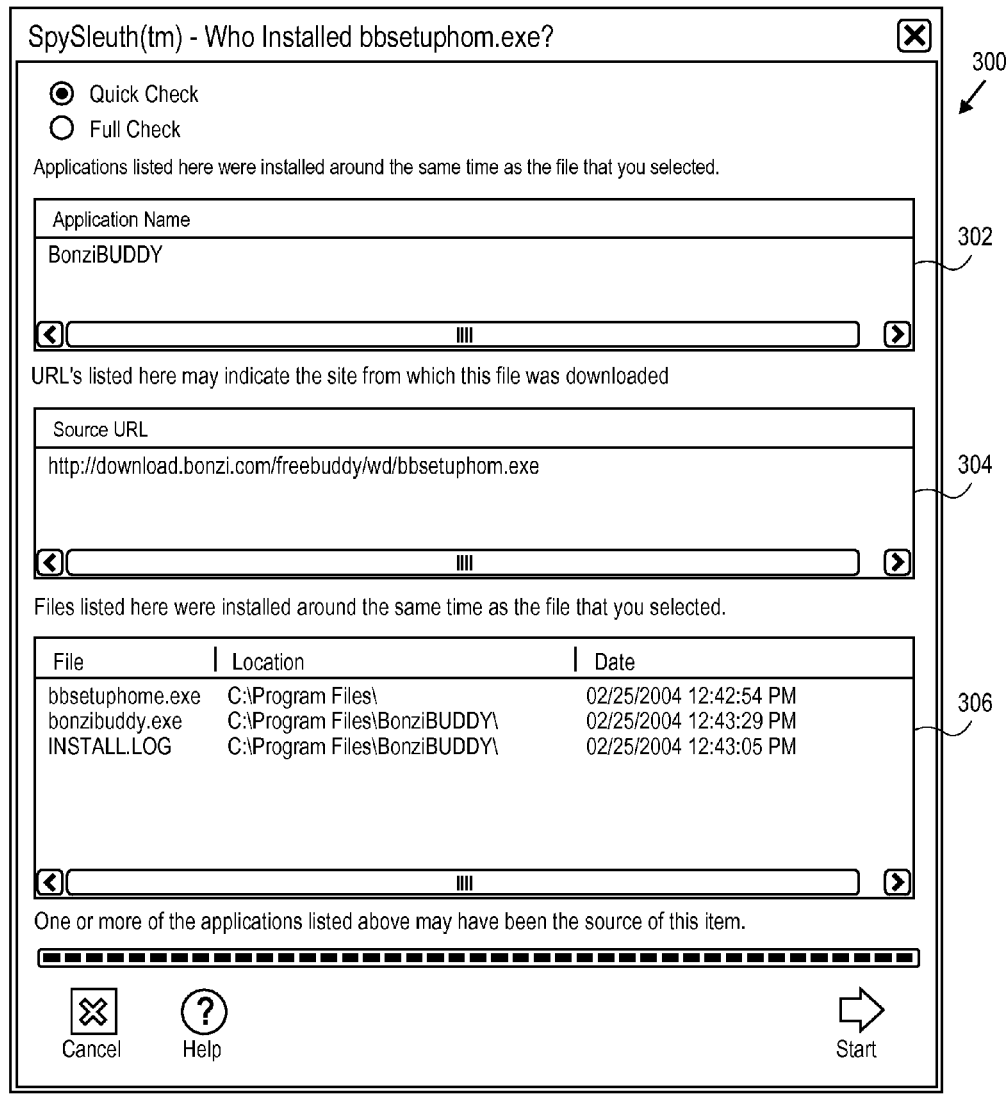
FIG. 5 is a screenshot of the resulting information identifying the potential source of malware, provided in accordance with the present invention.

In accordance with a further practice and embodiment of the invention, FIG. 5 is a screenshot depicting the output 300 of the methods of the invention. The three results areas depict the output of the three different methods of determining the source of the selected file. Area 302 is the Application Name list that lists the output from Method 3, area 304 is the Source URL list that details the output from Method 2, an area 306 list details the related files found using Method 1. FIG. 5 is an example of a screen shot of the anti-malware application component source detection screen.

CONCLUSIONS

Those skilled in the art will understand that the invention described herein by way of example provides significant technical advantages over the prior art, by enabling users and administrators to detect and identify the existence and source of spyware and other malware files and applications, and to prevent the installation of such files or applications.

Those skilled in the art will also appreciate that the foregoing examples are provided by way of illustration and detailed description, and that numerous variations, modifications, additions and changes are possible, and are within the spirit and scope of the invention. Those skilled in the art will also appreciate that the methods, systems and software products of the present invention are applicable to a virtually unlimited range of computing platforms, including personal computers (PCs), handheld or wireless computing devices, or any other networked or standalone computing platforms. The methods, systems and software products described herein can also be used to detect the existence and sources of files and file types other than those described by way of example above.

We claim:

1. A method for determining a source of a selected malware file in a user computer system, the method comprising:
    receiving a selection from a user on a first graphical user interface identifying a known malware file in said user computer system for analysis;
    receiving on said first graphical user interface an indication from said user to execute a function to determine said source of said known malware file;
    determining the creation date of said selected malware file;
    searching a file system associated with said user computer system for a file based on said creation date of the selected malware file;
    locating said file, said file being different from said malware file;
    determining that the creation date of said file of said file system matches said creation date of said selected malware file; and
    generating source information identifying at least one potential source of said selected malware file based on said matching, said source information including said file;
    providing a second graphical user interface for displaying the source information, wherein said source information includes a file name of said file; and
    displaying said source information on said computer system.

2. The method of claim 1, wherein the creation date of said selected malware file includes the date and time said selected malware file was created.

3. The method of claim 1, wherein searching the file system comprises executing a recursive directory search to iterate through all files under a defined root directory.

4. The method of claim 1, wherein the second graphical user interface displays directory paths associated with one or more files identified as potential sources of said selected malware file.

5. The method of claim 1, wherein the second graphical user interface displays one or more options selectable by a user to analyze or remove at least said files identified as a potential sources of said selected malware file.

6. The method of claim 1, wherein the creation date of said file of said file system matches the creation date of the selected malware file when the creation dates are within a specified time period.

7. A method for determining an internet source of a selected malware file in a user computer system, the method comprising:
- receiving a selection from a user on a first graphical user interface identifying a known malware file in said user computer system for analysis;
- receiving on said first graphical user interface an indication from said user to execute a function to determine said source of said known malware file;
- determining the file name of said selected malware file using said computer system;
- searching an internet cache associated with said user computer system based on the file name of said selected malware file, said internet cache including URL history entries and being maintained by a Web browser of said user computer system;
- determining that a URL history entry belonging to said internet cache contains the file name of said selected malware file; and
- generating source information, by said computer system, identifying at least one potential internet source of said selected malware file based on said URL history entry;
- providing a second graphical user interface for displaying said source information; and
- displaying said source information on said computer system.

8. The method of claim 7, wherein searching the internet cache comprises:
- iterating through each URL history entry belonging to said internet cache.

9. The method of claim 7, wherein the second graphical user interface displays directory paths associated with one or more files identified as potential sources of said selected malware file.

10. The method of claim 7, wherein the second graphical user interface displays one or more options selectable by a user to analyze or remove at least one of the potential sources of said selected malware file.

11. A method for determining the name of an application associated with a selected malware file in a user computer system, the method comprising:
- receiving a selection from a user on a first graphical user interface identifying a known malware file in said user computer system for analysis;
- receiving on said first graphical user interface an indication from said user to execute a function to determine a source of said known malware file;
- determining the full path file name of said selected malware file using said computer system;
- parsing the full path file name into segments based on their association with said malware file;
- determining that one of said segments is a root directory of said malware file;
- determining the name of the application which may have installed said malware file based upon said determined root directory; and
- generating source information, by said computer system, identifying the name of the application associated with said selected malware file based on said root directory;
- providing a second graphical user interface for displaying the source information; and
- displaying said source information on said computer system.

12. The method of claim 11, wherein the second graphical user interface displays directory paths associated with the application identified as a source of said selected malware file.

13. The method of claim 11, wherein the second graphical user interface displays one or more options selectable by a user to analyze or remove the application identified as a source of said selected malware file.

14. A method for determining the source of a selected malware file in a user computer system, the method comprising:
- executing an anti-malware application in said computer system;
- displaying a list of malware to a user on a first graphical user interface;
- receiving a selection from a user identifying said malware file to determine the source of the selected malware file;
- receiving on said first graphical user interface an indication from said user to execute a function to determine said source of said known malware file;
- determining at least one file installed at the same time as said selected malware file using a creation date of said malware file;
- determining at least one URL including the file name of said selected malware file by reference to an internet cache of URL history entries;
- determining at least one software application related to said selected malware file by reference to a root directory of a full path name of said malware file; and
- displaying, on a second graphical user interface, said at least one file, said at least one URL, and said at least one software application to said user on said computer system as being potential sources of said selected malware file.

15. The method of claim 14 further comprising:
- displaying on said second graphical user interface one or more options selectable by said user to analyze or remove at least one of said potential sources of said selected malware file.

* * * * *